Dec. 23, 1969 W. T. LYNCH 3,486,031

MEMORY CELL UTILIZING OPTICAL READ-IN

Filed June 5, 1967

INVENTOR
W. T. LYNCH
BY Arthur J. Torsiglieri
ATTORNEY 3,486,031

MEMORY CELL UTILIZING OPTICAL READ-IN

William T. Lynch, Summit, N.J., assignor to Bell Telephone Laboratories, Incorporated, Murray Hill, N.J., a corporation of New York Filed June 5, 1967, Ser. No. 643,657
Int. Cl. H01j 39/12
U.S. Cl. 250—209 6 Claims

ABSTRACT OF THE DISCLOSURE

A memory system in which read-in and, preferably read-out too, are controlled optically. In the preferred embodiment, a memory cell comprises a first phototransistor in series with a voltage source and a load, and the load is shunted by a rectifying element and a second phototransistor. For read-in light is made to irradiate the first phototransistor, for read-out the second phototransistor.

This invention relates to optical memory apparatus.

A variety of memories are now available for use in computing and switching systems. However, as the size of the memories grow, requiring larger numbers of unit cells, the importance of having a memory whcih can be accessed readily and quickly also grows. In particular, an important problem in large memories is the large number of connections and leads involved. An optical memory cell has the advantage that light can be used in place of conductive connections thereby reducing the number of leads required to a unit cell, and avoiding many of the crossover problems. Additionally, the use of light can simplify the isolation problem and also speed access.

The present invention is an optical memory cell which offers these advantages and additionally is well adapted for integration into arrays of a large number of cells in a unitary semiconductive element.

In particular, the basic cell comprises a photosensitive element, connected in series with a source of voltage and a parallel combination of a load and a series combination of unilaterally conductive element and a storage cell. Advantageously in the preferred embodiment, the photosensitive element and the storage cell are each phototransistors whereby both read-in and read-out can be controlled optically.

Figure 1:
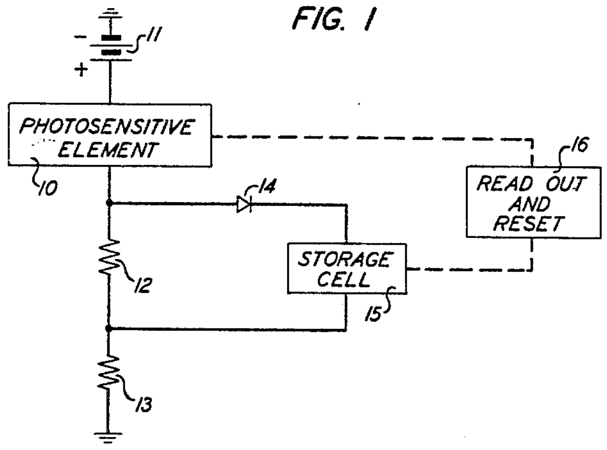
Figure 2:
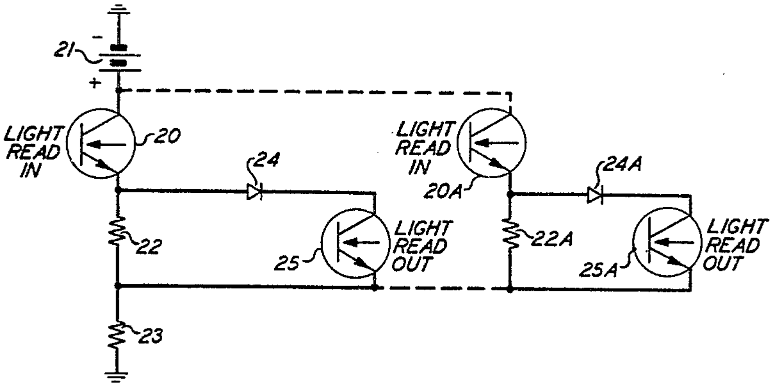

The invention will be described more fully in conjunction with the accompanying drawing in which:

FIG. 1 shows in block schematic the basic form of memory cell in accordance with the invention; and FIG. 2 shows in circuit schematic a preferred embodiment of the invention.

With reference now to the drawing, in the basic cell shown in FIG. 1, a photosensitive element 10 is connected intermediate between the D-C voltage supply 11 and the load shown as the resistors 12 and 13. The former resistor is shunted by the unilaterally conductive element 14 and the storage cell 15.

The photosensitive element may take a variety of forms. In the preferred embodiment, it is a junction type phototransistor to provide gain with respect to the input light, alhough the basic requirement is that it have a resisance which is high in the dark and low in the light. Suitable other forms of photosensitive elements include photoconductive elements and photodiodes including both the conventional type or the type that is operated biased in the avalanche region to provide gain.

The unilaterally conductive element 14 typically will be a PN junction diode poled to pass current flowing through the photosensitive element 10 when the latter is permitting the passage of current flow from source 11 but to block the reverse flow of current.

The storage cell 15 may take a variety of forms. In its simplest form, it is a capacitor. In the preferred form it is a junction type phototransistor. Alternatively, it may be a PN diode or a PNPN diode. Essentially what is required is an element with a large capacitance and so able to store the charge which flows in when the photosensitive element is irradiated and later to release at least part of this charge to the load during read-out. Since read-out ordinarily involves some loss of the charge stored, for nondestructive read-out it may be desirable to restore the lost charge. This can be done in a variety of ways and has been depicted schematically by the read-out and reset circuit 16. For example, this circuit is designed to detect the stored information and to utilize it to reenergize appropriately the photosensiive element 10 whereby the lost charge is restored. Its design is within the skill of the worker in the art and will not be described in detail here.

In operation, input information to be stored is made to provide light which is incident on the photosensitive element 10 designed to have a very high impedance in the dark and a relatively low impedance in light. As a consequence, current flows from the D-C supply 11 through the photosensitive element 10 through the unilaterally conductive element 14 in its easy direction and charges the storage cell 15 which is designed to have a suitably large capacitance. The larger resistor 12, the larger the stored voltage across cell 15. However, the upper limit on the resistance of element 12 is determined by the read-in time desired for the memory cell.

Upon termination of the light input to element 10, its resistance rises and current flow therethrough essentially stops except for leakage currents which are made to be small. Moreover, storage cell 15 is unable to discharge is stored charge effectively since to discharge current the element 14 offers a high impedance. Therefore the charge is trapped, its discharge limited to the reverse leakage current of element 14. The final steady state voltages across elements 14 and 15 are essentially equal, and of opposite polarity, with the actual voltage value being determined by the initial charging voltage across element 15 and the relative capacitances of elements 14 and 15.

For read-out, there is detected the state of the storage element in any of a variety of possible ways. A possible technique would be simply to reduce the path resistance introduced by element 14, as by shunting it by an electronic switch, and detecting the voltage increase across either of resistors 12 and 13.

FIG. 2 shows the preferred embodiment of the invention which is adapted both for read-in and read-out optically. The NPN junction phototransistor is connected serially with the D-C voltage source 21 and the load resistors 22 and 23. The load resistor 22 is shunted by the series combination of unilaterally conducting element 24 and the NPN junction transistor 25.

In operation, light incident on phototransistor 20 reduces its resistance and current flows therethrough from source 21, part of which flows in the shunt path comprising element 24 and the phototransistor 25. Since there is no base bias on the phototransistor 25, in the dark it acts basically as a capacitor serving to store the charge flowing therein from source 21. On termination of the light input to phototransistor 20 and cessation of current flow from the source 21, the charge stored in phototransistor 25 is unable to discharge, since this involves current flow in the reverse or high impedance direction through unilaterally conducting element 24. Accordingly, the charge stored by the phototransistor 25 is essentially trapped.

For read-out, light is made incident on the phototransistor 25 which reduces abruptly its impedance and it acts basically as a resistor. Under these conditions, the element 24 then acts as a charged capacitor, releasing its charge as current flow through the load 23, and the increase in voltage thereacross can be used as the output information. For this type of readout, element 24 should be chosen to have a large capacitance relative to the capacitance of element 25.

It should be apparent that the basic arrangement decribed in FIG. 1 can take a number of embodiments other than that shown in FIG. 2. For example, if optical readout were still intended, the phototransistor 25 could be replaced by a comparable photosensitive element having storage capacity, such as a PNPN diode appropriately biased to be switched by incident light. Moreover, if electrical read-out were desired, the phototransistor 25 could be replaced by a transistor provided with a third connection to which electrical drive could be used for reducing its impedance from a high capacitance to a low resistance.

It also should be evident that the main purpose served by dividing the load resistance into two parts is to enable resistor 23 to serve as a common load if a number of memory cells are combined in an array, as is usual, to provide a large amount of memory. If only a single cell were desired, resistor 23 would be superfluous. The addition of a second memory cell utilizing the common supply source 21 and load 23 is shown in FIG. 2, the suffix A being used to denote equivalent elements in the two cells.

Similarly other photosensitive elements could be substituted for the phototransistor 20. Typical of suitable photosensitive elements capable of very fast input response is a PN junction photodiode biased near its avalanche breakdown state, particularly if efforts are made to reduce the effects of microplasmas following the techniques described in the copending application Ser. No. 639,386 filed by A. Goetzberger on May 18, 1967, and having a common assignee with this application.

As previously indicated, it is usually desirable to utilize memory cells in large arrays whereby a large amount of information can be stored. Where large arrays are used, it is advantageous to employ integrated circuit techniques wherein a large number of elements are incorporated in a single slice of semiconductor material.

A large array of optically sensitive elements having a short term memory useful for integrating light is important to a camera type picture tube, for example, of the kind known as the vidicon. An array of memory elements of the kind shown in FIG. 2 can be used for this purpose. In such an arrangement one surface of the slice is made to include an array of phototransistors each of which serves the role of phototransistor 20 and on which the varying light is made incident, while the opposite surface of the slice is made to include an array of phototransistors each of which serves the role of phototransistor 25 and which are scanned sequentially by a uniform beam of light appropriately deflected in a scanning pattern. Moreover, to serve the role of element 24, PN junction diodes are similarly integrated in the slice, and even resistors to serve the role of resistor 22 may be introduced as appropriate regions in the slice.

A variety of ways to lay out an array of circuits of the kind shown in FIG. 2 in a single slice will be evident to a worker in the integrated circuit art and so the details will not be discussed herein.

Moreover, in the arrangements described the light beam can be used during read-in simply for scanning purposes and the storage information supplied simply as the presence or absence of a voltage across the photosensitive element at the time it is scanned. For example, in the arrangement of FIG. 2 an electronic switch would be inserted serially between voltage source 21 and the elements 20 and it would be under control of the information to be stored.

What is claimed is:

1. A memory cell adapted for optical read-in and optical read-out comprising
   - a series circuit of a photosensitive element, a voltage supply means and a load,
   - and in parallel with at least a portion of said load a series circuit of a unilaterally conductive means and photosensitive means which exhibits a high capacitive impedance in the dark and a low resistive impedance when irradiated,
   - said unilaterally conductive means poled to pass a portion of the current flowing through the photosensitive element when said element conducts photocurrent.

2. A memory array comprising a plurality of memory cells in accordance with claim 1 characterized in that they share a common voltage supply means and a portion of the load.

3. A memory array comprising a plurality of memory cells adapted for optical read-in and optical read-out, each of said memory cells comprising:
   - a series circuit including a photosensitive element, a voltage supply means, and a load impedance;
   - in parallel with at least a portion of said load impedance a series circuit of a unilaterally conductive means and a photosensitive means which exhibits a high capacitive impedance in the dark and a low resistive impedance when irradiated; and
   - said memory array arranged such that a particular voltage supply means is common to more than one cell, and such that a portion of a particular load impedance is common to more than one cell.

4. A memory array comprising a plurality of memory cells adapted for optical read-in of information to be stored, each of said cells comprising:
   - a series circuit including a voltage supply means, a load impedance, and a photosensitive element adapted to be irradiated with light information for changing its impedance from a relatively high value to a relatively low value;
   - in parallel with a portion of said load impedance means a series combination of a unilaterally conductive means and a capacitive means; and
   - said memory array arranged such that a particular voltage supply means is common to more than one cell and such that a portion of a particular load impedance is common to more than one cell.

5. A memory array as recited in claim 4 further comprising read-out means for detecting the charged state of the capacitive means.

6. A memory array as recited in claim 5 further comprising means in conjunction with the read-out means for restoring the state of a capacitive means after a readout operation.

References Cited

UNITED STATES PATENTS

| | | | |
|---|---|---|---|
| 3,160,859 | 12/1964 | Wilmotte | 340—173 |
| 3,182,797 | 5/1965 | Palmer | 250—209 X |
| 3,368,080 | 2/1968 | Nakagaia et al. | 250—219 |

FOREIGN PATENTS

| | | |
|---|---|---|
| 100,045 | 12/1961 | Netherlands. |

OTHER REFERENCES

Anacker et al.: Beam Operated Memory Cells, IBM Technical Disclosure, Bulletin vol. 9, No. 6, November 1966, pp. 737, 738.

JAMES W. LAWRENCE, Primary Examiner

E. R. LA ROCHE, Assistant Examiner

U.S. Cl. X.R.

307—311; 340—173